T. Shaw,
Steam Gage Cock.
Nº 65,018. Patented May 21, 1867.
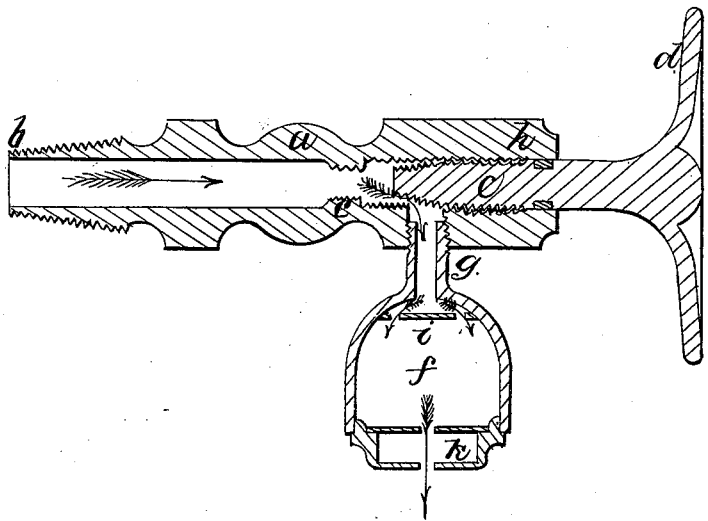
Witnesses:
Robert M Hutchinson
Elias J Shaw
Inventor
Thomas Shaw

United States Patent Office.

THOMAS SHAW, OF PHILADELPHIA, PENNSYLVANIA.

Letters Patent No. 65,018, dated May 21, 1867.

---

IMPROVEMENT IN STEAM-GENERATOR GAUGE-COCKS.

*The Schedule referred to in these Letters Patent and making part of the same.*

---

TO ALL WHOM IT MAY CONCERN:

Be it known that I, THOMAS SHAW, of the city and county of Philadelphia, Pennsylvania, have invented a new and improved construction and arrangement of Valves and Whistles; and I hereby declare the following to be a full, clear, and exact description of the same, reference being had to the accompanying drawing and the letters of reference marked thereon.

My invention consists in the construction of valve-seat and stem; also in combining a whistle, whereby a sound is produced when steam is passed through the same, as hereafter described.

In order to enable others to use and practise my invention, I will proceed to describe its construction and operation.

On reference to the accompanying drawing, which forms a part of the specification, the sketch represents a longitudinal vertical section through the centre of gauge-valve and whistle, of which $a$ is the barrel, provided with a male screw, $b$, for the purpose of attaching to boiler. $c$ is a screw-rod, provided with a disk-wheel, $d$, to enable the revolving of the screw-rod. Said rod is packed by coiling twine around a recess cut in said rod at $h$. The barrel $a$ has a central opening, which communicates with passage-ways, indicated by red arrows. Said opening in barrel $a$ is closed by means of screw-rod $c$, the end of which screws tightly into a threaded seat, $e$. $g$ is a whistle, screwed into and communicating with the passage-way of barrel $a$. Said whistle is provided with a partition, $i$, bored with small holes on the periphery for the purpose of avoiding a central current, and is also provided with chambers, $f$ and $k$, for the purpose of causing vibrations in the air when steam is passed through the same, all for the purpose as hereafter described.

The object of this invention is to enable the economic construction of valves that will be tight against pressure, and to inform the engineer of the presence of water or steam by sound.

It will be observed that a tight joint is secured in this construction of the valve by simply using tap and die; and that the rod is made steam-tight by securing the packing to the rod instead of the barrel; and that steam will produce a sound when passing through the whistle; and that water will not produce the same sound, by which means engineers are enabled to control the valve, and also be informed as to whether water or steam is passing through the same.

It will be evident that both the valve and whistle can be modified without any alteration in the result.

What I claim, and desire to secure by Letters Patent, is—

The construction and arrangement of the gauge-valve and whistle, whereby to control the pressure and to indicate the sound produced by steam, or steam and water commingled, or water unmingled with steam, substantially as set forth.

THOMAS SHAW.

Witnesses:
  HENRY A. BROGNARD,
  AMBROSE E. WITMER.